United States Patent [19]

Picard

[11] Patent Number: 4,642,810
[45] Date of Patent: Feb. 10, 1987

[54] REPETITIVE SEQUENCE DATA TRANSMISSION SYSTEM

[75] Inventor: Jean-Louis Picard, La Colle-sur-Loup, France

[73] Assignee: International Business Machines Corp., Armonk, N.Y.

[21] Appl. No.: 561,848

[22] Filed: Dec. 15, 1983

[30] Foreign Application Priority Data

Dec. 28, 1982 [EP] European Pat. Off. ........ 82430047.9

[51] Int. Cl.[4] ........................................... H04L 27/00
[52] U.S. Cl. ..................................... 375/37; 364/900
[58] Field of Search ........... 340/539, 348, 534, 825.44; 375/4, 121, 110, 106, 107, 66, 37; 364/200 MS File, 900 MS File

[56] References Cited

U.S. PATENT DOCUMENTS

| | | | |
|---|---|---|---|
| 3,335,404 | 8/1967 | Wood | 340/539 |
| 3,496,549 | 2/1970 | Tong | 364/900 |
| 4,031,515 | 6/1977 | Kashio | 364/900 |
| 4,241,419 | 12/1980 | Kronies | 364/900 |
| 4,368,534 | 1/1983 | Sibley | 364/900 |
| 4,413,341 | 11/1983 | Markhasin et al. | 364/900 |

*Primary Examiner*—Gareth D. Shaw
*Assistant Examiner*—Kevin A. Kriess
*Attorney, Agent, or Firm*—John B. Frisone

[57] ABSTRACT

A data transmission system wherein data are entered upon activation of input points of an entry unit (1) of the keyboard type, including a sequence generation unit (5) generating a series of "maximum length" sequences on to a series-output (8) and a different binary pattern for each bit in the sequence on to a parallel-output (6). Such a binary pattern is compared in a coincidence circuit (7) with the binary representation of an activated point of the entry unit (1) so as to produce a bit "one" on line (9) which alters, through an X OR circuit (10), the corresponding bit in the sequence to be transmitted over the transmission line (11).

5 Claims, 11 Drawing Figures

| CLOCK PULSES | $1^{ER}$ | $2^{EME}$ | $3^{EME}$ | $4^{EME}$ | $5^{EME}$ | $6^{EME}$ | $7^{EME}$ | $8^{EME}$ | $9^{EME}$ | $10^{EME}$ | $11^{EME}$ | $12^{EME}$ | $13^{EME}$ | $14^{EME}$ | $15^{EME}$ | $16^{EME}$ |
|---|---|---|---|---|---|---|---|---|---|---|---|---|---|---|---|---|
| FLIP-FLOP 21 | 1 | 1 | 0 | 1 | 0 | 1 | 0 | 1 | 0 | 1 | 0 | 1 | 0 | 1 | 0 | 1 |
| " 22 | 1 | 1 | 1 | 0 | 1 | 0 | 0 | 1 | 1 | 0 | 1 | 0 | 0 | 1 | 0 | 1 |
| " 23 | 1 | 1 | 1 | 1 | 0 | 0 | 1 | 0 | 0 | 0 | 1 | 1 | 1 | 0 | 0 | 1 |
| " 24 | 1 | 0 | 1 | 0 | 0 | 0 | 0 | 1 | 1 | 0 | 0 | 0 | 0 | 1 | 1 | 1 |

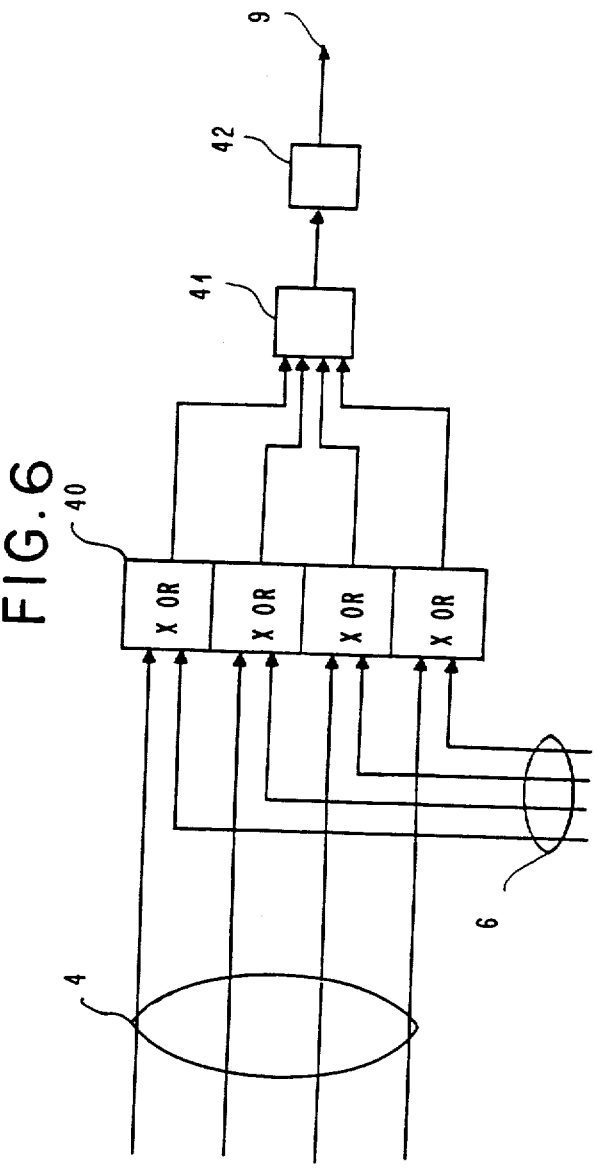

REPETITIVE SEQUENCE DATA TRANSMISSION SYSTEM

TECHNICAL FIELD

This invention relates, generally, to data systems and, more particularly, to a data transmission system making use of the "maximum length" sequence properties.

BACKGROUND ART

Data transmission systems of current use include now a keyboard, i.e., an input point data-entry unit wherein only one input point can be activated at a time, at any given time.

Such an entry unit system raises a problem in connection to data transmission. Such a transmission can be achieved in an analogical way. Such is the case in telephone keyboards wherein the activation of a key entails the transmission of a combination of several signals of different frequencies, each key being associated with a particular combination. Such an analogical transmission system is both costly and cumbersome while the improvements achieved in the integrated circuit technology are rapidly progressing to miniaturization together with a considerable drop of the prices.

Therefore, the use of digital data transmission is widely spread and, more particularly, is used in local transmission systems wherein an operator keys in data on his typewriter type keyboard terminal, which data are transmitted to a processor for tape-recording or printing out.

At present, the technique of wide use consists in transmitting the digital data in parallel form. This requires the use of a cable connecting the input terminal to the processor, which has as many wires as there are input points. It is obvious that this type of multiwire cable is costly because, from amongst other things, it is necessary, for instance, to have multipin connectors, which is not always of practical use.

Because of the above-mentioned drawbacks, it is, therefore, preferred to proceed to a serial transmission of the digital data coming from the terminal or entry unit. Such a serial transmission can be carried out either synchronously or asynchronously. The asynchronous transmission process consists in transmitting each data character that corresponds to the activation of an input point over the line, in an independent way, by means of a code beginning with a start bit and ending with one or two stop bits. On the reception side, synchronization is achieved upon detection of the start and stop bits. Unfortunately, when desynchronization occurs, this cannot be detected rapidly, thereby entailing an erroneous data reception.

In the so-called synchronous transmission process, data characters are within character frames having special characters at regular intervals, which are used for synchronization as start and, possibly, stop flags for further transmission of bit sequences or packets.

A system using such special characters is described in U.S. Pat. No. 3,335,404 in which the occurence of a particular event at a remote station modifies a chain code generated by a chain code generator, by inverting one or several bits of the chain code. The modified or unmodified chain code is transmitted to an intermediate station which transmits to the receiving station complete cycles of the modified chain codes received from the remote station together with an indication of which remote station the modified chain code has been received from.

DISCLOSURE OF THE INVENTION

Accordingly, the object of this invention is a digital data serial transmission system for serially transmitting data coming from a keyboard-type input point data-entry unit, wherein synchronization is achieved in a simple manner without requiring the use of special bits or characters.

The data transmission system according to this invention is comprised of a data-entry unit for entering data, upon sequential activation of input points from a plurality of input points, and an encoding circuit for encoding the position of the input point into a binary pattern. The system includes a repetitive sequence generation unit for generating the so-called "maximum length" sequences on a series-output thereof, in a synchronous way, and for generating different bit patterns for each of the bits in the sequence on a parallel-output thereof, a coincidence circuit connected to the encoding circuit output as well as to the parallel-output of the sequence generation unit for generating a signal when there is coincidence between the bit pattern generated by this unit and the binary representation of the activated input point position provided by the encoding circuit, and an X OR circuit for series-supplying the bit sequences generated by the sequence generation unit, except when the coincidence circuit provides a signal, in which case the signal is inverted.

Another object of this invention is to provide for a reception device comprised of a sequence generation unit identical with the generation unit of the transmission system, and in-phase therewith.

An important feature of this invention is a simple arrangement with which it is possible to obtain effective and rapid autosynchronization.

BRIEF DESCRIPTION OF DRAWINGS

FIG. 5, illustrates a sequence and this same sequence desynchronized in order to show the bits which are different in the two sequences.

FIG. 6, is a schematic diagram of a coincidence circuit used in a first embodiment of this invention.

BEST MODE FOR CARRYING OUT THE INVENTION

Figure 1:
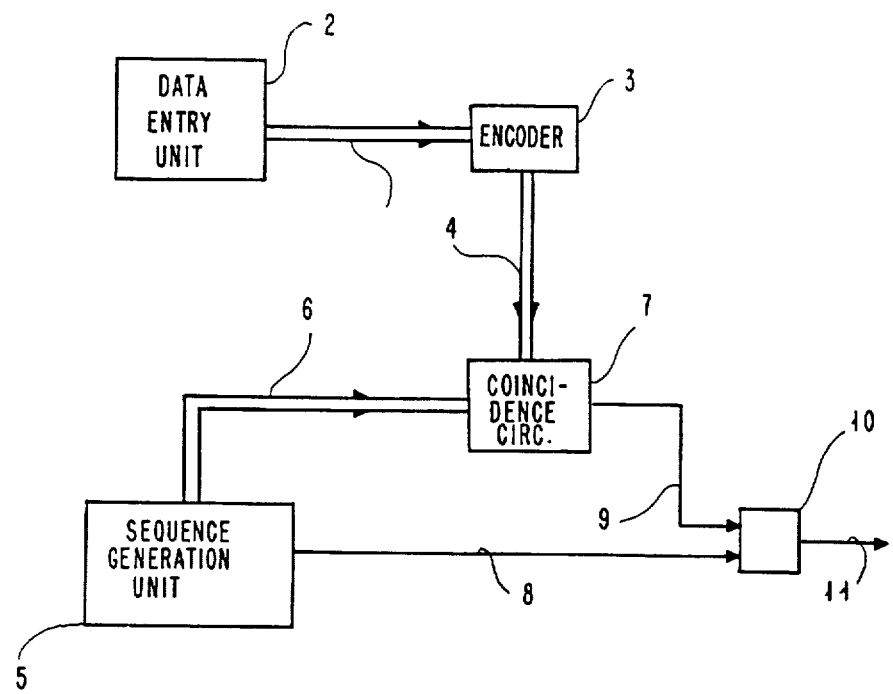
FIG. 1, is a schematic block diagram according to this invention.

FIG. 1 is a schematic block diagram of the transmission system according to this invention.

The data-entry unit 1 is of the keyboard type wherein each key corresponds to a data-entry point. Data are keyed-in each time one of the keys is operated by activating the corresponding input point. The result of this activation, which can be caused by an ohmic contact, a change in the capacity or any other alteration in the input point parameter, is that only one of the input points can generate a binary data element, such as, for instance, a bit 'one', from amongst a plurality of input points which are, all, in the opposite binary condition, namely "zero".

As the input points are being activated on the data-entry unit 1, the data (in the form of bits "one") are sent through bus 2 to an encoder 3 which codes each bit received into a binary representation having a value that is associated with the corresponding activated input point. As it will be seen further on, the number of the bit lines on bus 4 which produce the binary representation, is a function of the sequence generated by the sequence generation unit 5.

The sequence generation unit 5 generates, in a synchronous and repetitive way, the so-called "maximum length" sequence. Such a bit sequence, the principle of which is explained in the book entitled "Error-Correcting Codes" by W. W. Peterson, on page 224, has a number of properties which are used in this invention.

Figure 2:
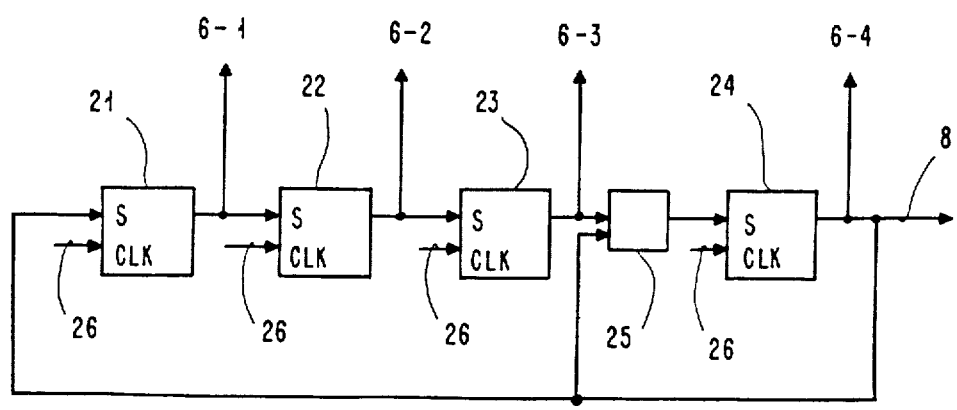
FIG. 2, illustrates an exemplary of a sequence generation unit used in this invention.

Before further describing FIG. 1 which illustrates the transmission system according to this invention, it should be advisable to explain in details the exemplary sequence generation unit in reference to FIG. 2. As shown in this figure, the sequence generation unit is comprised of four flip-flop circuits 21, 22, 23 and 24 and of one X OR circuit 25 interposed between flip-flop 23 and flip-flop 24. The flip-flop circuits are connected so that the output of flip-flop 21 is connected to the set input of flip-flop 22; the output of flip-flop 22 is connected to the set input of flip-flop 23; the output of flip-flop 23 is connected to one of the inputs of X OR circuit 25; the output of X OR circuit 25 is connected to the set input of flip-flop 24 and the output of flip-flop 24 is connected to the second input of X OR circuit 25 as well as to the set input of flip-flop 21. The assembly of the output lines 6-1, 6-2, 6-3 and 6-4 of the four flip-flop circuits forms bus 6 of the sequence generation unit 5 whereas the output of flip-flop 24 is the output line 8 of FIG. 1. Each of the flip-flop circuits has its clock input connected to a common clock 26, not shown, which produces in a synchronous way the clock pulses which are used to change the status of the flip-flop circuits.

Let us suppose that, at the beginning, the four flip-flop circuits 21 through 24, are set. In this case, the four output lines 6-1 through 6-4 provide a four-bit "one" configuration. Such a configuration changes as the flip-flop circuits change their status upon application of each clock pulse, such as shown in FIG. 3.

Figures 3, 4:
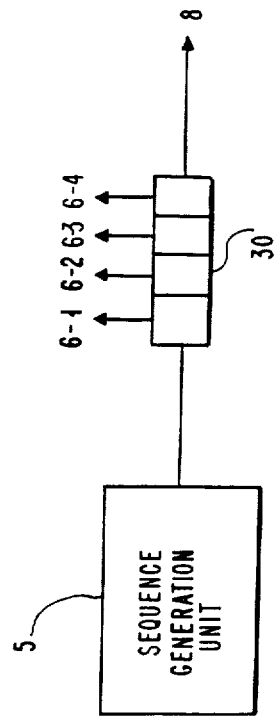
FIG. 3, is a table illustrating the "maximum length" sequence and the unique configuration obtained on the series-output and the parallel-output of the sequence generation unit of FIG. 2, respectively.
FIG. 4, illustrates another embodiment of the sequence generation unit.

FIG. 3 shows that, upon the sixteenth pulse, the output bit pattern of the four flip-flop circuits is identical with that existing upon the first impulse, i.e. is a four-"one" pattern. Of course, the patterns of the seventeenth, eighteenth pulses etc., not shown, will be identical with the configurations of the second, third, etc. pulses. Besides, each of the fifteen patterns from the first through the fifteenth clock pulses is different from the others and is one of the fifteen possible bit patterns obtained with four bits, except for the pattern formed of "zeros". It should be noted that such "all zero" configuration cannot occur since all the following patterns would be identically formed of "zeros". Consequently, bus 6 provides, in a repetitive way, a sequence of fifteen four-bit patterns, all different from one another.

The same result as previously, namely, a repetitive sequence of fifteen different four-bit patterns could be obtained by memorizing the output of flip-flop 24 in a shift register. (FIG. 4). The successive four-bit sets in the sequence obtained at the output of flip-op 24, indeed, are different and repeated every other fifteen bits. In that case, line 8 is at the output of shift register 30 and bus 6 is formed of the output lines of each of the stages of the shift register.

One of the significant properties of the preceding sequence is shown in FIG. 5. When comparing the sequence (bit-after-bit) which is provided on output 8 and this same sequence desynchronized by any number of bits, the number of the different bits is equal to 8, whatever be the desynchronization value between the two sequences. This property is constant for each of the so-called "maximum length" sequences. It comes to say that there are $2^{(N-1)}$ different bits between the sequence $2^N - 1$ bit long and this sequence desynchronized by any number of bits. Thus, should the sequence generation unit of FIG. 2 be comprised of only three flip-flop circuits, the sequence would be 7 bit and any desynchronization would lead to a number of different bits equal to 4. Likewise, with a sequence generation unit being, now, comprised of five flip-flop circuits, the obtained sequence would be 31 bit and any desynchronization would lead to a number of different bits equal to 16, between two sequences.

This feature is of importance for this invention, as it will be seen further on. Let us assume that, upon reception of the data transmitted from the transmission system of FIG. 2, there is a sequence generation unit identical with the sequence generation unit 5 and synchronized therewith. When no data are coming from unit 1, the bit sequences produced by the two sequence generation units are identical as long as such units are synchronized. When desynchronization occurs, the sequences produced by the two units are different. However this desynchronization may be, it occurs in the form of 8 different bits out of the 15 bits in the sequence.

Now, when modifying one of the 15 bits in the sequence generated by unit 5, two possibilities can occur. When the two generation units (transmission and reception) are synchronized, only one bit is different between the two sequences. When the two units are desynchronized, the bit altered is either one of the 8 different bits between the two sequences, or one of the 7 bits which are not different, which comes to have 7 or 9 different bits. The same reasoning holds true when altering 2, 3, or more, bits in the sequence. The following table illustrates the different possibilities which may arise when transmitting data by altering some bits in the sequence.

| Number of altered bits | Different Bits | |
|---|---|---|
| | Synchronized units | Desynchronized units |
| 0 | 0 | 8 |
| 1 | 1 | 7 through 9 |
| 2 | 2 | 6 through 10 |

-continued

| Number of altered bits | Different Bits | |
| --- | --- | --- |
| | Synchronized units | Desynchronized units |
| 3 | 3 | 5 through 11 |
| 4 | 4 | 4 through 12 |
| 5 | 5 | 3 through 13 |

It is obvious that, in each of the assumptions, the number of the difference bits includes number 8 which corresponds to a sequence non altered (no activated input point) though desynchronized.

Therefore, it can be seen that a desynchronization between the two units will be easily detected when only 1, 2 or 3 bits are altered. Indeed, in these three assumptions, the number of the different bits, when there is desyncrhonization, is at least equal to 5, whereas, when there is synchronization, only 3 bits are altered (3-bit alteration assumption).

On the other hand, there would be uncertainty in the case the alteration would be 4 bits, or more, since desynchronization could possibly be unnoticed, the number of the different bits between the two sequences being able to be identical, whether desynchronization occurs or not.

It is, therefore, advisable to limit the alteration to a data-alteration of a number of the bits in the sequence lower than the limit number (equal to $2^{(N-2)}$ with $2^N - 1$ sequences), from which there would be uncertainty when desynchronization occurs. So, with the sequence generation unit 5 of FIG. 1, it is advisable to alter 1, 2 or 3 bits out of the 15 bits in the sequence.

As seen in the foregoing, the bit pattern obtained at the outputs of the flip-flop circuits, which the sequence generation unit 5 is comprised of, are unique in that they are different for each bit in the sequence. Such patterns are sent through bus 6 to coincidence circuit 7. When coincidence occurs between the bit patterns 6-1 through 6-4 (see FIG. 2) and the coded representation of the activated input point of data-entry unit 1, a bit "one" is transmitted over line 9. In that case, the bit of the sequence, supplied over line 8 by the sequence generation unit 5, is "altered" by X OR circuit 10 before its being produced on line 11; that is to say, when the bit in the sequence is equal to "one", a "zero" is transmitted over line 11, and, conversely, a bit "one" is transmitted when the bit in the sequence is equal to "zero". It is obvious that when none of the input points of unit 2 is activated, the bit transmitted over line 1 is of the same value as that of the bit in the sequence transmitted over line 8.

It should be noted that the frequency of clock 26 is such that the time length of a sequence (15-bit sequence in FIG. 2) is definitely lower than the minimum time length during which an input point is activated so that a sequence cannot be altered by the activation or more than one input point.

As seen previously, it is, however, possible to alter several bits in the sequence without exceeding a limit number from which uncertainty occurs in case of desynchronization. With the sequence generation unit of FIG. 2, 1, 2 or 3 bits, for instance, can be altered, which corresponds to maximum numbers of the input points which are equal to 15, 105, or 455, respectively.

When making use of a sequence generation unit comprised of five flip-flop circuits, alteration of 1, 2 or 3 bits corresponds to maximum numbers of the input points, which are equal to 31, 465, 4495, respectively. On the other hand, when the unit is comprised of only three flip-flop circuits, only one bit can be altered so that there is no uncertainty in case of desynchronization. In that case, the maximum number of the input points is seven.

Figure 7:
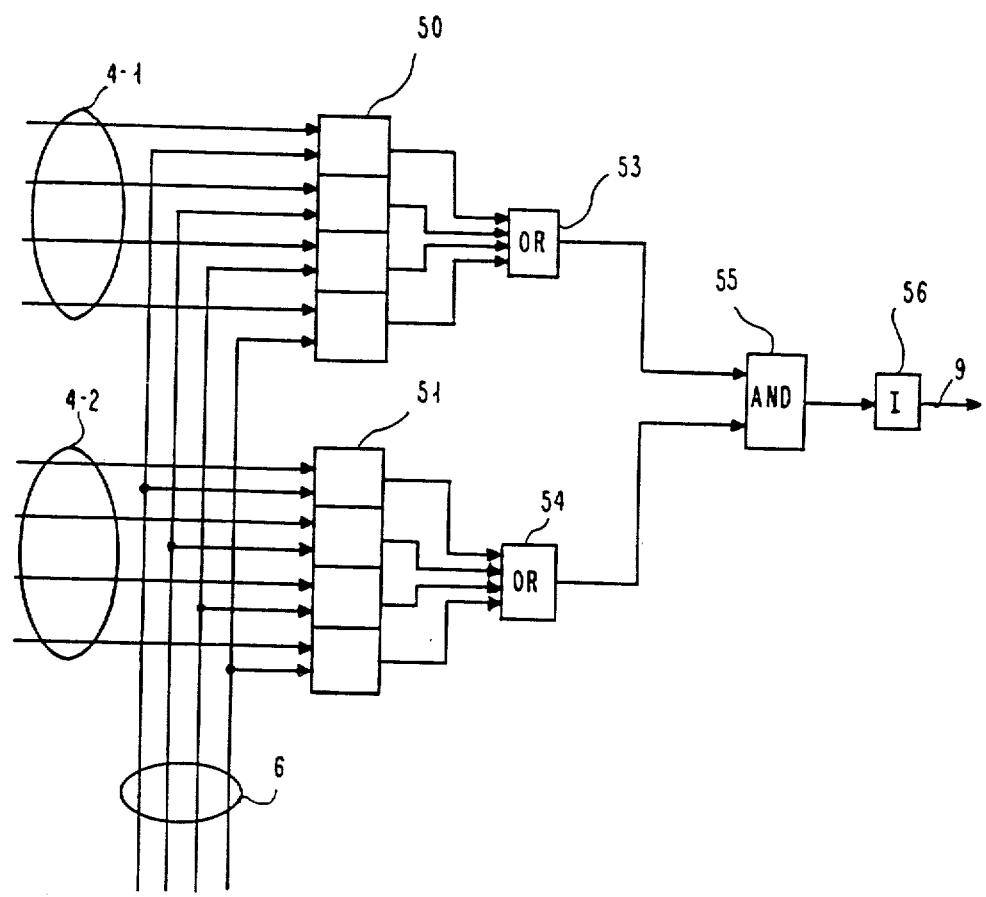
FIG. 7, is the schematic diagram of a coincidence circuit used in another embodiment of this invention.

In connection with the four-flip-flop sequence generation unit of FIG. 2, the concidence circuit (see FIG. 1) is described in reference to FIGS. 6 and 7.

FIG. 6 illustrates a coincidence circuit used with an entry unit having at most 15 input points. In that case, bus 4 from encoder 4 (FIG. 1) is comprised of four lines producing the input point binary representations. These four lines are associated with the four lines of bus 6, respectively, which come from the sequence generation unit, as inputs of four "X OR" circuits 40. When coincidence occurs between the binary configuration representative of the activated input point and the parallel-output configuration of the sequence generation unit, the outputs of the X OR circuits are all reset to zero. These outputs are connected as inputs to OR circuit 41 which, in that case, produces a bit "zero" which is inverted in inverter 42 in order to finally produce a bit "one" on line 9. In any other cases, at least one of the inputs to OR circuit 41 is set to "one", and a bit "zero" is transmitted over line 9.

FIG. 7 illustrates a coincidence circuit used with an input unit having between 16 and 105 input points. In that case, the input bus 4 is divided into two portions 4-1 and 4-2 being comprised, each, of four lines, the eight line assembly producing the input point binary representations. Each four-line group 4-1 and 4-2 line-to-line is associated with the four parallel-output lines 6 of the sequence generation unit, as inputs to two X OR circuits groups 50 and 51. As seen previously, the activation of an input point produces two binary patterns (on the bus portions 4-1 and 4-2) in coincidence with two of the four-bit output patterns provided on bus 6. When coincidence occurs, either of the OR circuits 53, 54 outputs a bit "zero". Consequently, AND circuit 55 outputs a bit "zero" which is inverted by inverter 56 so as to transmit a bit "one" over line 9. Thus, two bits within a same fifteen-bit sequence will be altered since there are two coincidences during this sequence. In the other cases, at least one of the inputs of each OR circuit 53 or 54 is set to "one" and, as a consequence, a bit "one" is produced at the output of AND circuit 55, and a bit "zero" is transmitted over line 9, through inverter 56.

It is obvious for the man skilled in the art that, when the entry unit is comprised of within 106 and 455 input points, the binary representation of the input coming from the encoder, then applies to twelve lines. In that case, therefore, it is necessary to have three groups of four "X OR circuits, and three OR circuits so as to alter three bits in a same sequence.

Likewise, though FIGS. 6 and 7 illustrate a four-line bus 6 coming from the four-flip-flop sequence generation unit of FIG. 2, other designs are possible. With a five-flip-flop sequence generation unit, bus 6 would be comprised of five lines, which would correspond to a maximum number of the input points equal to 31, for FIG. 6, and equal to 465, for FIG. 7.

Figure 8:
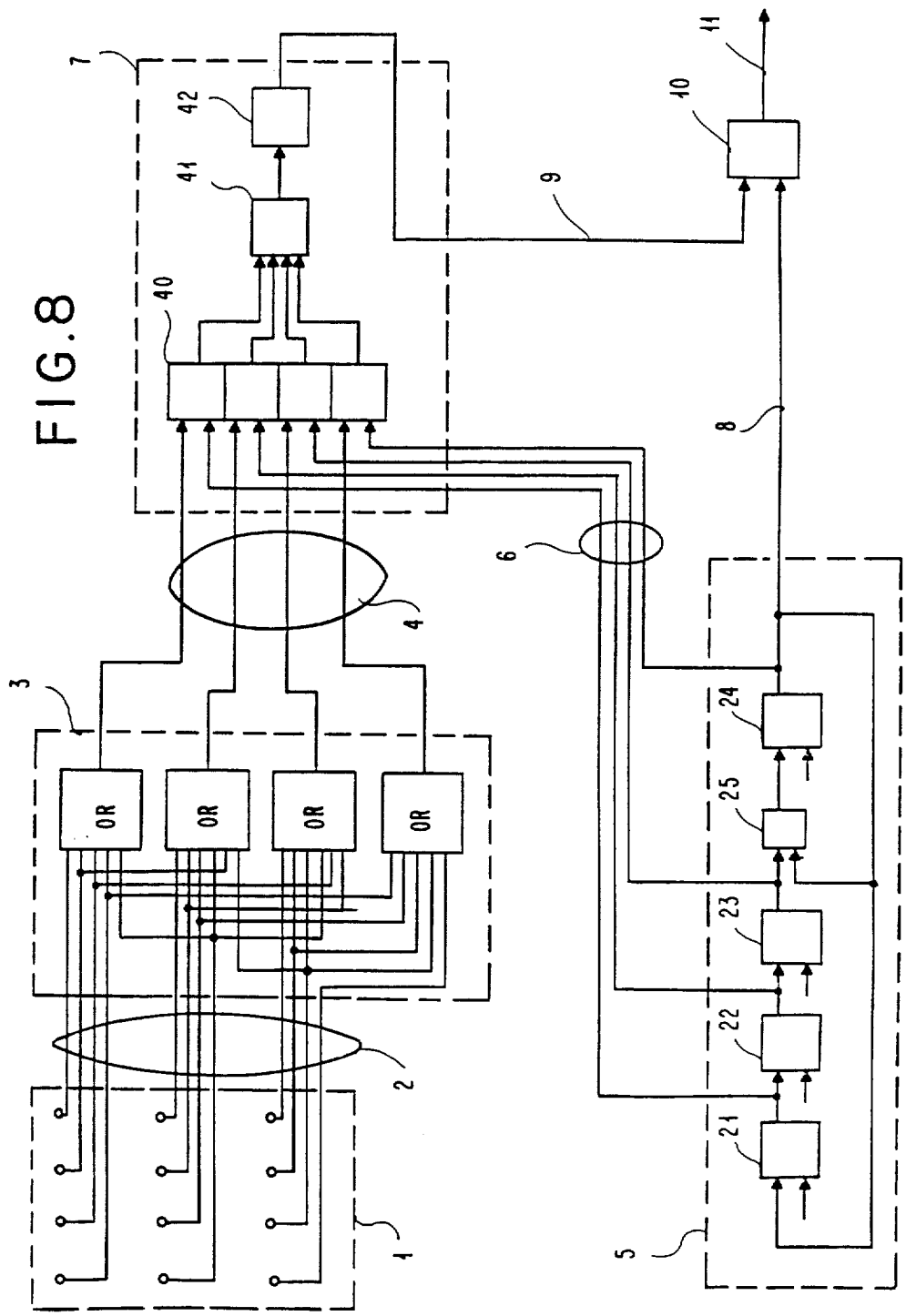
FIG. 8, is a schematic diagram illustrating an exemplary transmission system according to this invention.

A transmission system according to this invention is shown in FIG. 8. In this figure, the designations of the elements shown are the same as those utilized in the preceding figures.

In this figure, unit 1 is a telephone keyboard type point-to-point entry unit having twelve keys, ten for digits 0 through 9 and two special keys. The contacts, not shown, of the input points of entry unit 1 are connected to encoder 3 through the twelve-line bus 2. Encoder 3 produces the four-bit patterns representative of each input point of unit 1, over the four-line bus 4. It should be noted that, though the encoder, here, is comprised of four OR circuits, it is possible to use any other encoder without departing from the spirit of this invention. As seen previously, each pattern produced over bus 4 is compared in coincidence circuit 7 with the parallel-output on bus 6 from the sequence generation unit 5, formed of the four flip-flop circuits, which this unit is comprised of. Upon coincidence, a bit "one" transmitted over line 9, then, alters the bit, in X OR circuit 10, which is being generated on line 8 by the sequence generation unit. Such an altered bit, finally, is transmitted over line 11.

Figure 9:
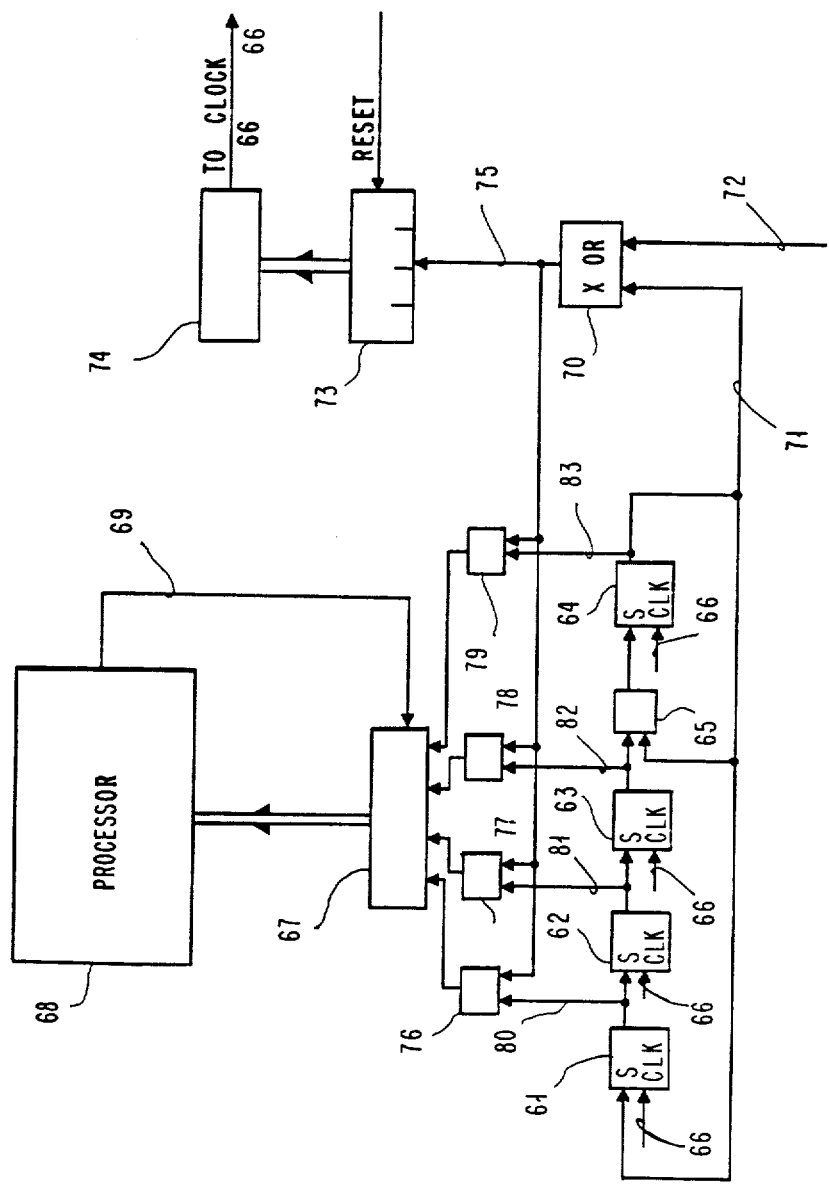
FIG. 9, is a schematic diagram illustrating a reception device adapted to the transmission system of this invention.

A reception device adapted to the previously-mentioned system, is shown in FIG. 9. In this figure, the receiver includes a unit identical with the sequence generation unit of the transmission device of FIG. 8, i.e., it has four flip-flop circuits 61, 62, 63 and 64 arranged in a loop configuration, one X OR circuit 65 being interposed between the third and fourth flip-flop circuits. A clock 66 synchronized with clock 26, produces clock pulses in order to cause the so-called "maximum length" sequence sent over line 71 to progress. The bits in the generated sequence are transmitted to the input of "X OR" circuit 70 the other input 72 of which receives the bits transmitted by the transmission system of FIG. 8.

Assuming that the sequence generated over line 71 is identical with that generated by the sequence generation unit 5, i.e., assuming that there is no desynchronization; then, the two inputs 71 and 72 of the "X OR circuit" are identical and the output 75 is reset to "zero". When an altered bit is received on line 72, circuit 70 produces a bit "one" at its output 75. This bit "one" sets the four AND gates 76, 77, 78 and 79, which makes it possible for the bits provided on the parallel-outputs 80, 81, 82 and 83, to be loaded into the four-bit register 67. Processor 68, then, can read the contents from register 67, through control line 69, which is sent as an input into the table giving those "character" codes which correspond to the different patterns received. The processor operation, however, is no part of this invention, and, therefore, will not be disclosed herein.

The output 75 of "X OR circuit" 70 increments a four-bit counter 73. Such a counter, therefore, is incremented by any altered bit received on line 72, and is reset by a reset circuit (not shown) at the end of each time interval that corresponds to the time length of a "maximum length" sequence. When desynchronization occurs between the sequence generation unit of the transmission system and the corresponding unit of the reception system, the counter is incremented a number of times higher than, or equal to, seven, such as mentioned above. In that case, encoder 74 provides a control signal to clock 66. Such a control signal, then, blocks the clock during one-bit time. This operation is repeated as long as decoder 74 detects a number of altered bits at least equal to seven until synchronization occurs again between the two units, in which case there is only one (or none) bit altered during each bit sequence time. The synchronization time length, of course, can correspond to the reception of a plurality of erroneous characters. Though the processor-operated resynchronization operations are not the essential characterizing part of this invention, emphasis should be laid on the fact that the basic principle of this invention which consists in making use of "maximum length" sequences, makes it possible to detect easily and rapidly any desynchronization between transmission and reception of the data, which has not been always the case in the prior art systems.

The embodiment which has been explained in reference to FIGS. 8 and 9 includes a twelve-key entry unit, but it is obvious that other embodiments are conceivable without departing from the spirit of the invention. Thus, with the same four-flip-flop sequence generation unit, but with a number of input points within 16 and 105, such as, for instance, for an interactive terminal of a data processing system, encoder 3 (FIG. 8) would be different as well as coincidence circuit 7 which could be the one shown in FIG. 7. Likewise, in FIG. 9, register 67 would include eight-bit positions instead of four, and would be loaded twice.

Figure 10B:
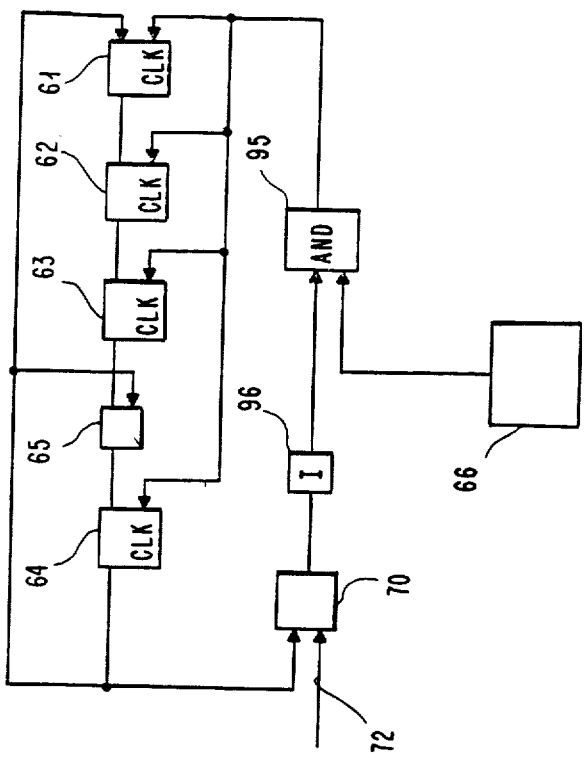
FIGS. 10A and 10B, are the arrangements on both transmission side and reception side for autosynchronization of the reception device of FIG. 9.
Figure 10A:
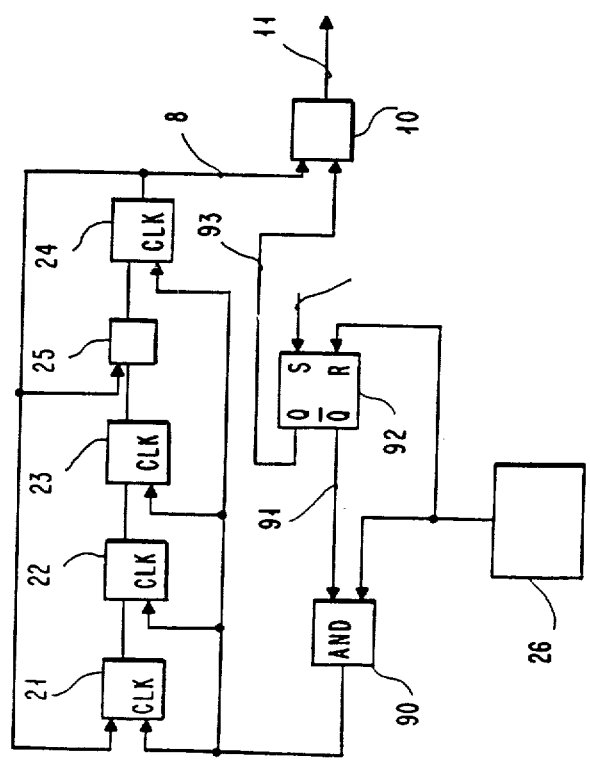

FIGS. 10A and 10B illustrate an important feature of the invention, namely, the autosynchronization procedure when there is desynchronization between the sequence generation unit on the transmission side and the same unit, on the reception side.

The four flip-flop circuits 21, 22, 23 and 24 of the sequence generation unit of the transmission system have been shown in FIG. 10A with their clock input connected to the output of AND circuit 90 the two inputs of which are formed of the output of clock 26 as well as the inverted output (Q̄) of flip-flop 92. The output line 9 from coincidence circuit 7, instead of being directly connected to the input of "X OR circuit" 10, is connected to the set input of flip-flop 92. It is, indeed, the output Q of flip-flop 92 which is connected to "X OR circuit 10". Therefore, when a coincidence signal is produced over line 9, flip-flop 92 is set and produces a bit "one" on line (Q) 93 so as to alter the bit in the sequence provided at the other input of the "OR circuit", through line 8. At the same time, a bit "zero" is sent by the inverted output (Q̄) of flip-flop 92, over line 91 and makes AND circuit 90 non-conducting, which prevents the clock pulse 26 intended for the progression of the sequence, from being transmitted. As a consequence, the output of flip-flop 24, over line 8, is identical during a two-bit time. However, whereas during the first one-bit time, the bit in the sequence is altered, the same is not, during the second one-bit time because flip-flop 92 has been reset by the clock pulse, thereby supplying a bit "zero" to "X OR circuit" 10, over line 93. Such an arrangement, therefore, causes a delay to be introduced, which is equal to one-bit time each time a bit in the sequence is altered, the bit transmitted during this delay being that bit in the sequence which would have been transmitted beforehand, in the case the alteration should not have occured.

The explanation given in reference to FIG. 10B makes it possible to understand this important autosynchronization characteristic.

Indeed, on the reception side, clock 66 does not supply directly clock pulses to flip-flop circuits 61 through 64, but, instead, through AND circuit 95. The second input of AND circuit 95 is provided with the output of "X OR circuit" 70 inverted by inverter 96. When the reception system is synchronized with the transmission system and when a non altered bit is received on the input line 72, circuit 70 supplies a bit "zero". This bit is inverted by circuit 96 which causes AND circuit 95 to be conducting for the clock pulses 66. When an altered bit is received on line 72, "X OR circuit" provides a bit "one" which is inverted by inverter 96, which makes AND circuit 95 non conducting. As a consequence, during that one-bit time which follows the altered bit, flip-flop circuits 61-64 do not receive clock pulses, and the same bit in the sequence is provided to the input of circuit 70. It is obvious that such a bit corresponds to the delayed and non-altered bit received on line 72. The AND circuit, therefore, is conducting anew, thereby enabling the clock pulses to cause the progression of the sequence.

When desynchronization occurs, it has been seen above that an important number of bits (higher than a given threshold) was altered. With the arrangement of FIG. 10B, each of these bits will entail one bit-time delay during which the sequence will not progress through flip-flop circuits 61-64, until recovery of the synchronization, in which case this delay will occur only for the bits altered on the transmission side, such as explained in the foregoing. The time used for the recovery of the synchronization is obviously very short, about two bit sequences, at most. Thus, in the embodiment shown in FIG. 8, desynchronization causes at least seven bits to be altered which, for one-bit delay for each bit different, requires an autosynchronization time which is two sequence long for a maximum fourteen-bit desynchronization.

Though this invention has been disclosed in reference to a keyboard-type entry unit, the man skilled in the art will easily understand that any other point-to-point entry, such as for instance, the digital measurement points of an automated industrial process, remains within the scope of this invention.

What is claimed is:

1. A repetitive sequence data signal transmission system having a transmitter means and a receiver means interconnected by a data signal transmission medium:

said transmitter means including:

first selectively operable means (13) for providing at an output thereof (4) a coded data signal corresponding to the operation selected, a first repetitive sequence generating means (5) for generating in a synchronous manner a plurality of bits arranged according to a repetitive sequence and providing said repetitive sequence in series on a first output (8) and providing on a second parallel output (6) for each bit in the sequence a unique bit pattern, a coincidence circuit means (7) having a first input connected to the output of the first selectively operable means (4) and a second input connected to the second parallel output of the said first repetitive sequence generation means (6) for providing on an output of the coincidence circuit means (9) an output signal whenever coincidence exists between the signal applied to the said first and second inputs of the said coincidence circuit means, and a first exclusive OR circuit means (10) having a first input connected to the output of the said coincidence circuit means (9) and a second input connected to the first output (8) of the first repetitive sequence generating means for supplying at an output thereof the bit sequence received from the first output of the first repetitive sequence generating means except when the output from the coincidence circuit means provides an output signal indicating that coincidence exists between the first and second inputs thereto and for inverting at its output the bit received at the second input whenever the coincidence circuit means signals a coincidence between the first and second inputs thereto via a signal on its output, and means connecting the output of the first exclusive OR circuit means to one end of the said data signal transmission medium;

said receiver means including;

a second repetitive sequence generation means (61-65) for generating in a synchronous manner a plurality of bits arranged according to the same repetitive sequence as the said first repetitive sequence generation means included in the said transmitter means, said second repetitive sequence generation means having a first output (71) for providing the said sequence of bits in series and a second output (80-83) providing a unique parallel output signal for each bit in the sequence, a second exclusive OR circuit means having a first input connected to the other end of said data signal transmission medium and a second input connected to the said first output of the said second repetitive sequence generation means for providing at an output thereof an output control signal whenever the signals received at the said first and second inputs of the said second exclusive OR circuit means differ from each other on a bit by bit basis, and gate circuit means connected to the said second output of the said second repetitive sequence generation means for providing the said output to a utilization means under control of the said output control signal provided by the said second exclusive OR circuit means.

2. A repetitive sequence data signal transmission system as set forth in claim 1 further including a counter circuit means connected to the output of the said second exclusive OR circuit means and responsive to the output control signals supplied thereby for generating and providing a control signal for controlling the operation of said second repetitive sequence generation means whenever the counter circuit means detects the presence within a sequence, of N or more output control signals provided by the said second exclusive OR circuit means, whereby the second sequence generation means is resynchronized with the said first sequence generation means.

3. A repetitive sequence data signal transmission system as set forth in claim 1 further including:

first delay circuit means connected to the said coincidence circuit means output and responsive to the output signal provided for causing a one bit time delay in the said first repetitive sequence generation means each time an output signal is provided, and second delay circuit means connected to the output of said second exclusive OR circuit means and responsive to the said output control signal for causing a one bit time delay in the said second repetitive sequence generating circuit means each time a said control signal is provided by the said second exclusive OR circuit means whereby synchronization between the said first and second repetitive sequence generation circuit means is maintained.

4. A repetitive sequence data signal transmission system as set forth in any one of claims 1, 2 or 3 wherein said first and second repetitive sequence generation means each includes a maximum length sequence generator having a plurality of series connected flip-flops arranged in a loop configuration and in which said first output is taken from one of the flip-flops and said second output is taken in parallel from all of the flip-flops.

5. A repetitive sequence data signal transmission system as set forth in claim 2 wherein the first output of the first repetitive sequence generating means is applied to a shift register having a number of stages with each said stage providing an output indicative of the state the stage is in equal to the number of bits in the sequence and the second output is provided by the outputs of all the stages of the shift register.

* * * * *